US011208214B2

United States Patent
Western et al.

(10) Patent No.: US 11,208,214 B2
(45) Date of Patent: Dec. 28, 2021

(54) RECOVERY SYSTEM USING VEHICLE STATE INFORMATION

(71) Applicant: Kitty Hawk Corporation, Palo Alto, CA (US)

(72) Inventors: Craig Western, San Francisco, CA (US); Damon Vander Lind, Alameda, CA (US); Eric Miller, Santa Cruz, CA (US); James Thomas Yaru, Sunnyvale, CA (US); Timothy Mattson, San Jose, CA (US); Andrew David Goessling, Fremont, CA (US)

(73) Assignee: Kitty Hawk Corporation, Palo Alto, CA (US)

( * ) Notice: Subject to any disclaimer, the term of this patent is extended or adjusted under 35 U.S.C. 154(b) by 212 days.

(21) Appl. No.: 16/744,620

(22) Filed: Jan. 16, 2020

(65) Prior Publication Data

US 2021/0070455 A1 Mar. 11, 2021

Related U.S. Application Data

(63) Continuation of application No. 16/565,135, filed on Sep. 9, 2019, now Pat. No. 10,569,889.

(51) Int. Cl.
*B64D 17/74* (2006.01)
*B64D 17/72* (2006.01)
*B64F 5/60* (2017.01)
*B64C 29/00* (2006.01)

(52) U.S. Cl.
CPC ............ *B64D 17/74* (2013.01); *B64D 17/725* (2013.01); *B64F 5/60* (2017.01); *B64C 29/0033* (2013.01)

(58) Field of Classification Search
CPC ......... B64D 17/74; B64D 17/725; B64F 5/60; B64C 29/0033
See application file for complete search history.

(56) References Cited

U.S. PATENT DOCUMENTS

| 5,232,184 | A | * | 8/1993 | Reuter | B64D 17/64 244/147 |
| 6,817,579 | B2 | * | 11/2004 | van der Velden | B64C 37/02 244/118.5 |
| 2003/0218100 | A1 | * | 11/2003 | Preston | B64D 17/58 244/149 |
| 2009/0189022 | A1 | * | 7/2009 | Hoffmann | B64D 17/74 244/152 |
| 2016/0280380 | A1 | * | 9/2016 | Fourie | B64D 17/80 |

* cited by examiner

*Primary Examiner* — Justin M Benedik
(74) *Attorney, Agent, or Firm* — Van Pelt, Yi & James LLP

(57) ABSTRACT

A selection is made between single stage and multistage parachute deployment for a vehicle based at least in part on vehicle state information. In the event multistage parachute deployment is selected, a drogue parachute is deployed during a first deployment stage and afterwards, a main parachute is deployed during a second deployment stage. In the event single stage parachute deployment is selected, at least the main parachute is deployed in a single stage where in the event the drogue parachute is deployed during the single stage, the drogue and main parachute are deployed simultaneously.

20 Claims, 11 Drawing Sheets

| 300 Airspeed Range | 302 Parachute Deployment |
|---|---|
| 304 (0, airspeed_thresh) | Single Stage |
| 306 (airspeed_thresh, airspeed_max) | Multistage |

| 400 Tilt Angle of Tiltrotors | 402 Parachute Deployment |
|---|---|
| 404 (-90°, tilt_angle_thresh) | Single Stage |
| 406 (tilt_angle_thresh, 0°) | Multistage |

RECOVERY SYSTEM USING VEHICLE STATE INFORMATION

CROSS REFERENCE TO OTHER APPLICATIONS

This application is a continuation of co-pending U.S. patent application Ser. No. 16/565,135 entitled RECOVERY SYSTEM USING VEHICLE STATE INFORMATION filed Sep. 9, 2019 which is incorporated herein by reference for all purposes.

BACKGROUND OF THE INVENTION

New types of aircraft are being developed for usage in crowded urban environments. For example, vertical takeoff and landing (VTOL) vehicles such as multicopters are attractive because for takeoff and landing they only require a small amount of space. This makes them feasible for use in more densely populated areas. However, one drawback of multicopters is that they tend to be slow during forward flight. Traditional aircraft can fly faster than multicopters during flight, but they require a long runway for takeoff and landing. New types of vehicles, for example that incorporate tiltrotors, are being developed to combine the small takeoff and landing footprint of multicopters with the faster forward flight speeds of traditional aircraft. However, as these new types of vehicles are developed, new types of problems not previously encountered by multicopters or traditional aircraft can pop up. New types of accessories, components, and/or features which can accommodate these new types of vehicles would be desirable.

BRIEF DESCRIPTION OF THE DRAWINGS

Various embodiments of the invention are disclosed in the following detailed description and the accompanying drawings.

DETAILED DESCRIPTION

Figure 1:
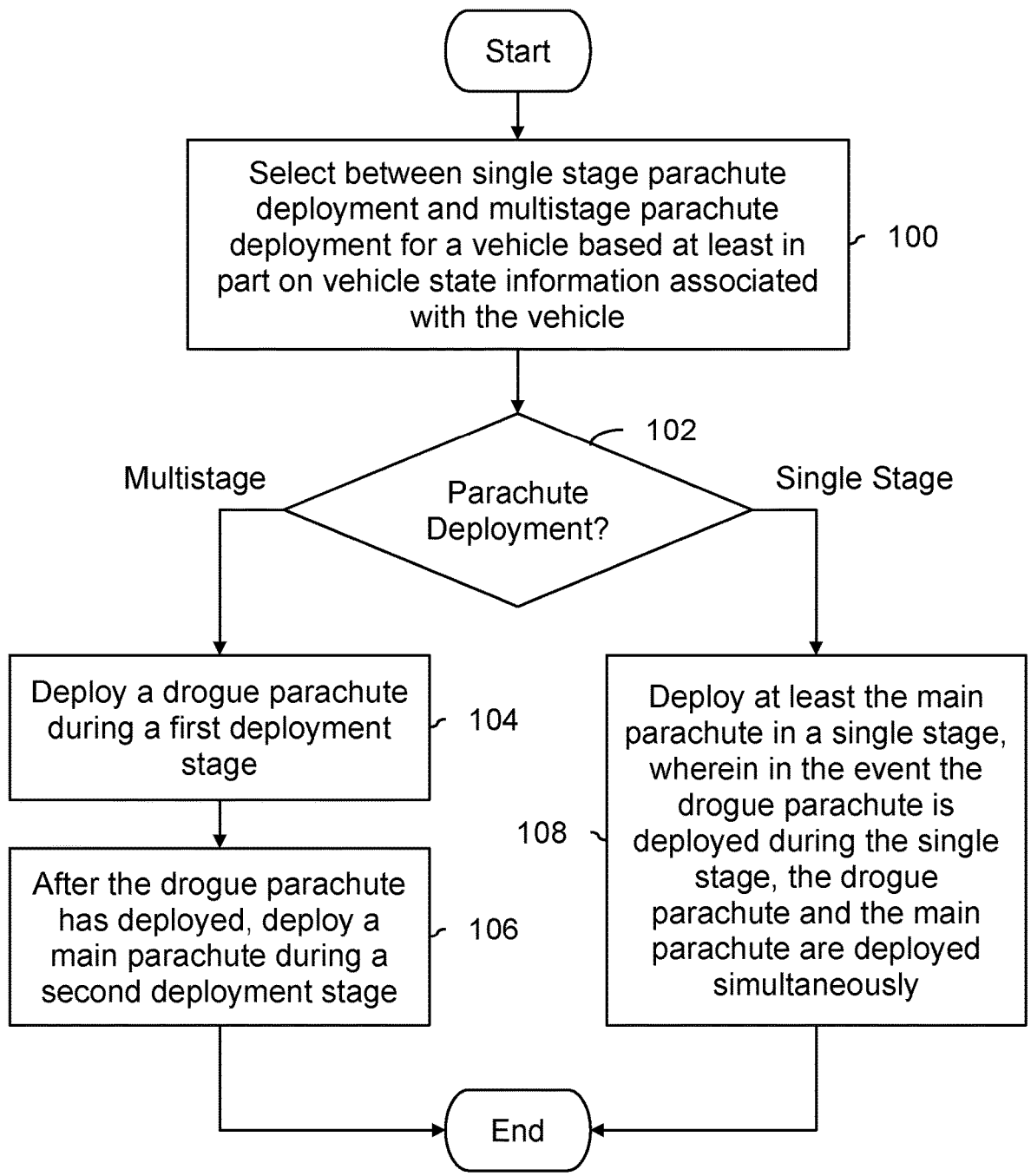
FIG. 1 is a flowchart illustrating an embodiment of a process to deploy a recovery system in either a single stage or multiple stages.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Various embodiments of a recovery system that makes decisions and/or decides what type of parachute deployment strategy or mode to use are described herein. In one example, the parachute deployment system is used in an aircraft with tiltrotors which enable the aircraft to fly over a much wider and/or different range of speeds compared to other types of aircraft (e.g., multicopters, traditional aircraft, etc.) that have included recovery systems. In some embodiments, a recovery system controller selects between single stage parachute deployment and multistage parachute deployment for a vehicle based at least in part on vehicle state information associated with the vehicle. If multistage parachute deployment is selected (e.g., due to the vehicle's airspeed or some other vehicle state information when the recovery process was initiated) then a drogue parachute is deployed during a first deployment stage and after the drogue parachute has deployed, a main parachute is deployed during a second deployment stage. Otherwise, if single stage parachute deployment is selected, at least the main parachute is deployed in a single stage, wherein in the event the drogue parachute is deployed during the single stage, the drogue parachute and the main parachute are deployed simultaneously. For single stage, in some embodiments, only the main parachute is deployed. In some other single stage embodiments, both the drogue parachute and the main parachute are deployed (simultaneously). In some embodiments, an airspeed threshold is used to decide whether to only deploy the main parachute or both the drogue parachute and main parachute simultaneously during single stage mode. For example, both parachutes are deployed simultaneously during single stage mode if the vehicle's airspeed is above some threshold and only the main parachute is deployed is below the threshold.

FIG. 1 is a flowchart illustrating an embodiment of a process to deploy a recovery system in either a single stage or multiple stages. In some embodiments, the process is performed by a controller in a recovery system, sometimes referred to herein as a recovery system controller. For example, the recovery system may include (in addition to the recovery system controller) a main parachute, which is always deployed, and a drogue parachute, which is (optionally) not deployed (e.g., in some single stage deployment embodiments), deployed at the same time as the main parachute (e.g., in some single stage deployment embodiments), or deployed before the main parachute, The process shown here is performed or otherwise initiated when there is a decision to use or otherwise deploy the recovery system (i.e., deploy the parachute(s)). In some cases, a pilot (e.g., manually) initiates this process and then the recovery system controller uses the process shown here to decide which parachute deployment mode to use. Or, the recovery system controller may (e.g., automatically, without guidance or instruction from the pilot) detect or otherwise determine that there is some (catastrophic) failure which requires the deployment of the recovery system.

At 100, a selection is made between single stage parachute deployment and multistage parachute deployment for a vehicle based at least in part on vehicle state information associated with the vehicle. In some embodiments, the vehicle state information that is used to make this selection is the vehicle's airspeed. In some applications, the vehicle includes tiltrotors which (when pointing in the appropriate direction or angle) enable the vehicle to hover (e.g., at airspeeds at or near 0) or perform wing-borne flight (e.g., at significantly higher airspeeds). In some embodiments, additional and/or other types of vehicle state information (e.g., besides airspeed) is/are used (e.g., the tilt angle of the tiltrotors, etc.).

In some embodiments, a vehicle's altitude is not used directly in deciding whether to perform single stage parachute deployment or multistage parachute deployment at step 100, but the vehicle's altitude is used by the flight computer to constrain the vehicle at certain altitudes to certain airspeeds which in turn causes certain (e.g., better) parachute deployment mode selections or decision. For example, below some altitude threshold, the flight computer may limit the vehicle's (maximum) airspeed and the lower and/or limited airspeeds ensure or otherwise guarantee selection of single-stage deployment mode at these lower altitudes. Above that altitude threshold, the pilot is permitted by the flight computer to fly as fast as desired and depending upon the pilot's selected flight speed, either multistage or single stage deployment mode is selected. In some applications, having the flight computer control or otherwise limit the vehicle's airspeed in this manner based on the vehicle's altitude is desirable because it allows the system to have maximum coverage and to minimize the minimum altitude required for full parachute deployment and deceleration before touchdown. In particular, activating the multistage deployment mode below a certain altitude could result in insufficient time for the parachute(s) to sufficiently inflate and slow the vehicle down before impact, which is undesirable. In this manner, the flight controller may operate in manner that helps the recovery system controller to make a better selection about how to deploy the parachute(s). Having the flight computer limit the vehicle's (maximum) airspeed below some altitude threshold may also be desirable because a vehicle is more likely to encounter obstacles (e.g., trees, building, electrical or telephone wires, etc.) at lower altitudes and flying at slower airspeeds may give the pilot more time to detect and avoid collisions or at least reduce damage if there is a collision.

In various embodiments, a variety of sensors are used to measure the vehicle state information used at step 100. In one example, airspeed is the vehicle state information used at step 100 and the airspeed is measured using one or more pitot tubes. The measured airspeed may be sent from a pitot tube to a flight controller (sometimes referred to herein as a flight computer) and the flight controller may forward the airspeed on to a recovery system controller (e.g., that controls the recovery system, such as when it is appropriate to automatically deploy the recovery system, whether to deploy the drogue parachute first or not, etc.). In another example, if the vehicle state information that is used is the tilt angle of a vehicle's tiltrotors, then a servo sensor (e.g., associated with and/or which receives information from a servo which controls the position of the tiltrotors) may be used. In some embodiments, acceleration is used and an inertial measurement unit (IMU) is used to measure the vehicle's acceleration. Any appropriate sensor may be used based on the particular application (e.g., what is already available in the vehicle, taking into account any space or weight limitation(s), etc.).

In some embodiments, vehicle state information is filtered, smoothed, and/or sampled (e.g., selectively) before being used to make a selection at step 100. For example, if a major structural failure is detected, then the pitot tube readings (i.e., vehicle airspeed) are assumed to be bad due to incorrect vehicle orientation past the point in time of the failure. Filtering or otherwise processing recent data as described above (e.g., ignoring the data once or if a failure is detected) helps to ensure that the correct mode is selected. Sensor information of various types from multiple channels or sources (e.g., pitot, tilt, IMU) may also be combined and/or weighted together in order to improve the accuracy of mode selection (e.g., as more is learned about optimal parachute deployment).

Some examples of pieces or types of vehicle state information that can be used to select parachute deployment mode (e.g., at step 100) and/or (as will be described in more detail below) determine an amount of delay between a drogue parachute and a main parachute include: vehicle airspeed, vehicle tilt angle, direction of vehicle velocity (e.g., from an IMU, covered in detail), acceleration (from an IMU, accelerometers, etc.), angle of attack, vehicle orientation, and/or vehicle rates (e.g., from a gyroscope).

In the event multistage parachute deployment is selected (102), a drogue parachute is deployed during a first deployment stage at 104. At 106, after the drogue parachute has deployed, a main parachute is deployed during a second deployment stage. For example, if the vehicle is flying at a relatively high speed (e.g., above some airspeed threshold), the drogue parachute will slow the vehicle down until it is flying at a sufficiently slow speed where the main parachute can be safely deployed without the main parachute tearing or ripping. The main parachute then further slows down the vehicle's descent.

In various embodiments, the amount of time between deployment of the drogue parachute (at step 104) and the main parachute (at step 106) may be determined in a variety of ways. In some embodiments, a predefined or fixed lag or amount of time between the two is used. In some embodiments, the amount of time is determined based on (current) vehicle state information. The vehicle state information used to calculate the lag may be the same set of state information used at step 100 to select the parachute deployment type, or may be a different set of state information.

Returning to step 102, in the event the selected parachute deployment type is single stage, at 108 at least the main parachute is deployed in a single stage, wherein in the event the drogue parachute is deployed during the single stage, the drogue parachute and the main parachute are deployed simultaneously. For example, both the drogue parachute and the main parachute may be deployed simultaneously at step 108. Or, the main parachute may be deployed by itself and the drogue parachute is not deployed at all. If the aircraft is flying at a low rate of speed (see, e.g., the example ranges discussed below with respect to FIG. 3) then it is not necessary to perform multistage deployment where first the drogue parachute is deployed and then subsequently the main parachute is deployed with some lag or delay between the two. In fact, deploying a drogue parachute and then subsequently the main parachute when it is not necessary to do so can be detrimental if the aircraft is at a relatively low altitude. In such cases, the aircraft will need as much time as possible with the main parachute inflated in order to slow down the aircraft to a safe (crash) speed. As such, in one example, if the airspeed is below some airspeed threshold then single stage deployment is performed where (1) only the main parachute is deployed or (2) the drogue and the main parachutes are deployed simultaneously, because deploying the drogue parachute and then subsequently the main parachute (i.e., performing multistage deployment) would unnecessarily delay deployment of the main parachute and thus unnecessarily delay deceleration of the vehicle.

In one example application, the process of FIG. 1 is used in an aircraft with tiltrotors which enable the aircraft to perform vertical takeoffs and/or vertical landings. The following figures show an example tiltrotor aircraft which may perform the exemplary process shown in FIG. 1.

Figure 2A:
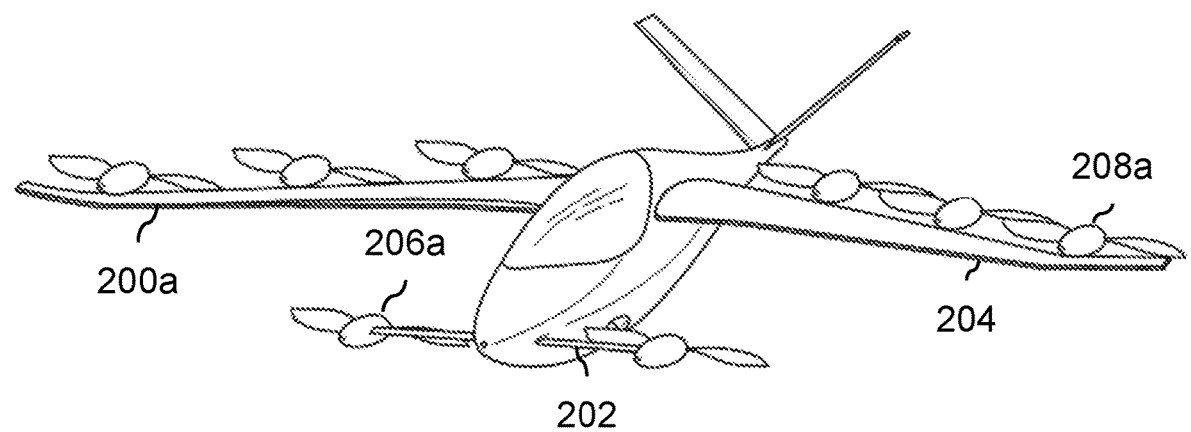
FIG. 2A is a diagram showing a perspective view of an embodiment of a tiltrotor aircraft.

FIG. 2A is a diagram showing a perspective view of an embodiment of a tiltrotor aircraft. In the example shown, the aircraft (200a) includes a canard (202) and a main wing (204). In this aircraft, there are two tiltrotors (206a) attached to the canard and six tiltrotors (208a) attached to the main wing. The tiltrotors in this example are attached to the canard and main wing via bollards which include a tilting mechanism (not shown) which permits the tiltrotors to point downward (shown in the next figure).

When the tiltrotors (206a and 208a) are pointing down (not shown here), the downward thrust from the tiltrotors provides sufficient lift to keep the vehicle airborne. In other words, the aircraft is able to hover mid-air and fly at relatively low speeds (e.g., at or near 0 knots). If desired, the vehicle can perform vertical takeoffs and/or vertical landings by having the tiltrotors point down.

If the tiltrotors (206a and 208a) are rotated to point backwards (shown here), the aircraft transitions to a forward flight mode where the aircraft is moving forwards fast enough so that the aircraft is kept airborne by the aerodynamic lift force on the main wing (204), sometimes referred to herein as wing-borne flight. In this mode, the aircraft is able to fly at relatively high speeds (e.g., a maximum speed of 150 knots during normal flight). By making both single stage and multistage parachute deployment available and selecting the appropriate one in real time using vehicle state information associated with the vehicle, the recovery system can be used over the entire range of speeds for the exemplary aircraft (e.g., anywhere from 0 knots to 150 knots).

In contrast, a traditional fixed-wing, fixed-rotor aircraft (e.g., which always performs wing-borne flight) cannot hover mid-air and does not need to worry about deploying a parachute at or near 0 knots per hour. Such a traditional aircraft has a different range of speeds and therefore its recovery system would not have to encounter the same set of flight and parachute deployment conditions.

The example aircraft shown here is also different from a multicopter (e.g., with rotors in fixed positions that generally point downwards) because such multicopters cannot fly in a forward flight or wing-borne flight mode. As such, multicopters tend to be much slower than tiltrotor vehicles (such as the one shown here).

This means that recovery systems which were developed for traditional fixed-wing, fixed-rotor aircraft or for multicopters will not necessarily work with tiltrotor aircraft because the range of speeds over which a tiltrotor aircraft can fly is quite different from the range of speeds of a traditional aircraft or multicopter.

The recovery system embodiments disclosed herein have many advantages over conventional systems. In one aspect, the recovery system embodiments minimize altitude loss including for tiltrotor aircraft. For example, with a one-size-fits-all approach where the same deployment sequence is performed (e.g., always perform multistage deployment), the aircraft could unnecessarily lose altitude. The tiltrotor aircraft may fly at lower altitudes than other types of aircraft and so any unnecessary altitude loss is dangerous for the pilot/passengers. In another aspect, the recovery system embodiments reduce loading on an occupant or vehicle at attachment points. For example, if single stage deployment were always performed, this could put dangerous load levels on the occupant or vehicle, causing harm to the occupant, causing structural overload of the airframe or parachute, and/or resulting in unnecessarily high system mass to account for high loads.

Figure 2B:
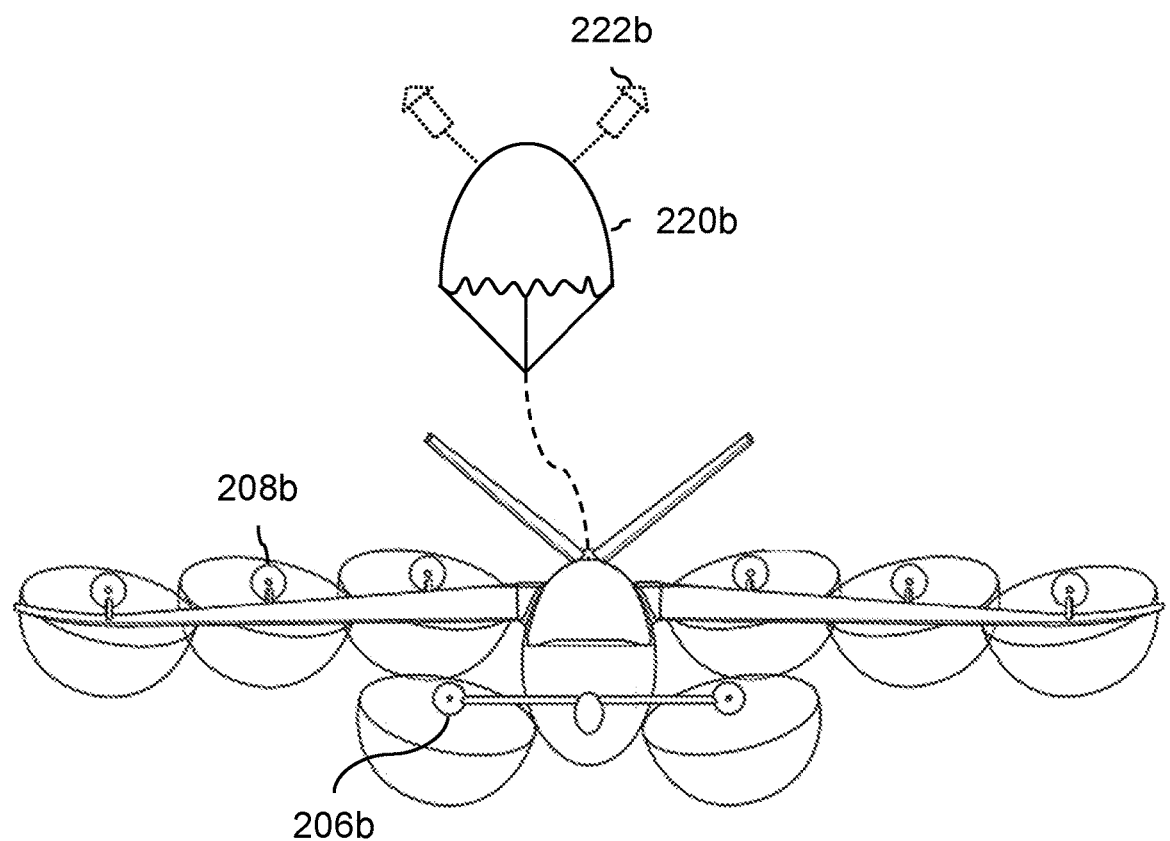
FIG. 2B is a diagram showing a front view of an embodiment of a tiltrotor aircraft which performs a single stage parachute deployment using only the main parachute.

FIG. 2B is a diagram showing a front view of an embodiment of a tiltrotor aircraft which performs a single stage parachute deployment using only the main parachute. In this example, the aircraft (210) is shown from the front with the rotors (206b and 208b) on and pointing and thrusting (generally) downwards. For example, when the tiltrotors are angled downward as shown here, the vehicle may be hovering mid-air or flying at a relatively low speed. In this mode (e.g., at lower speeds and/or when the tiltrotors are angled in a generally downwards direction), one deployment strategy is to perform single stage parachute deployment where only the main parachute (220b) is deployed and the drogue parachute (not shown) is not deployed, as shown here. This is one example of how step 108 in FIG. 1 may be performed.

Alternatively, in some embodiments, both parachutes are deployed simultaneously in this mode (e.g., at lower speeds and/or when the tiltrotors are pointing downwards). The following figure shows an example of this.

Figure 2C:
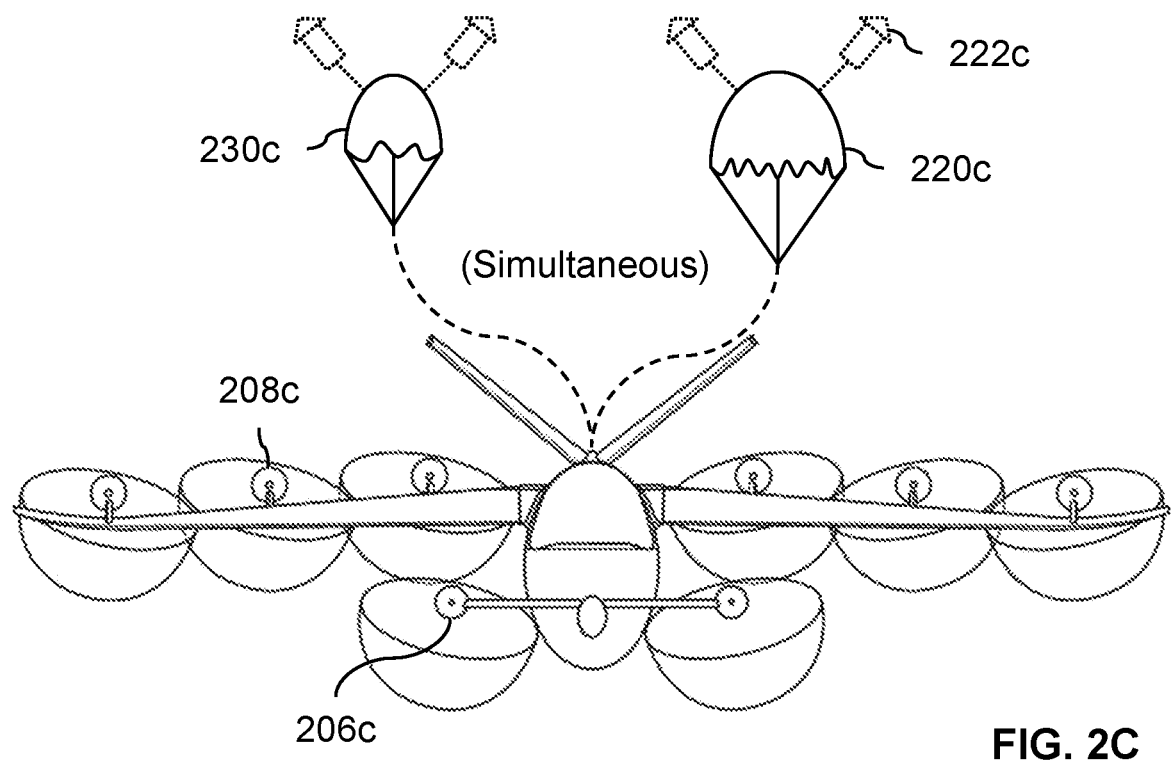
FIG. 2C is a diagram showing a front view of an embodiment of a tiltrotor aircraft which performs a simultaneous parachute deployment.

FIG. 2C is a diagram showing a front view of an embodiment of a tiltrotor aircraft which performs a simultaneous parachute deployment. As in the previous example, the rotors (206c and 208c) are pointing and thrusting downwards so that the vehicle is flying at a relatively low speed (e.g., hovering mid-air or flying forwards slowly). In this example, the drogue parachute (230c) and main parachute (220c) are deployed simultaneously. In some embodiments, the drogue parachute is cut away or otherwise detached from the main parachute after both parachutes are fully inflated (at least for some simultaneous deployment embodiments). If the two parachutes were deployed separately with some delay between the two in the state shown here, that delay would unnecessarily delay deployment of the main parachute and the vehicle would unnecessarily lose altitude before the main parachute fully inflated. This is another example of how step 108 in FIG. 1 may be performed.

In this example, to further reduce inflation time, the main parachute (220c) and drogue parachute (230c) are ballistic parachutes which are deployed using one or more rockets (222c).

Figure 2D:
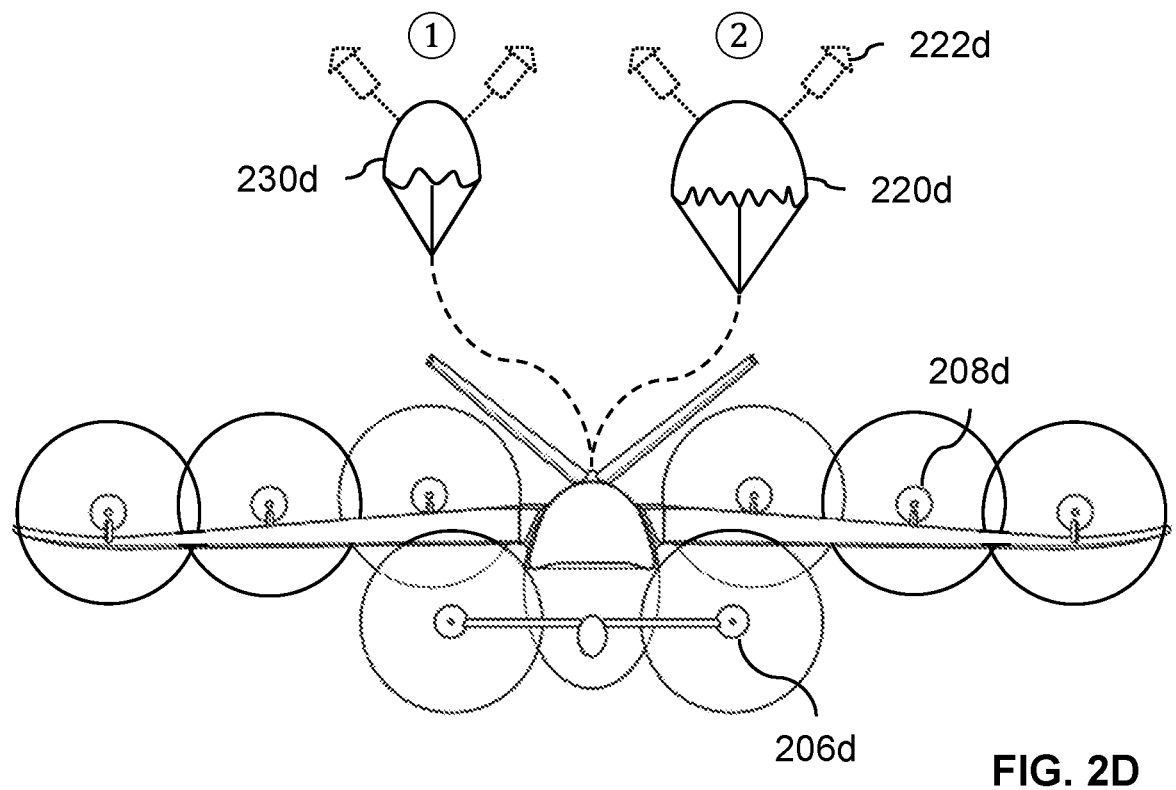
FIG. 2D is a diagram showing a front view of an embodiment of a tiltrotor aircraft which performs a multistage parachute deployment.

FIG. 2D is a diagram showing a front view of an embodiment of a tiltrotor aircraft which performs a multistage parachute deployment. In this example, the rotors (206d and 208d) are pointing and thrusting (generally) backwards. In this mode (e.g., at higher speeds and/or when the tiltrotors are angled in a generally backwards direction), a multistage parachute deployment is performed in this example where the drogue parachute (230d) is first deployed, and then the main parachute (220d) is deployed. In some embodiments, the drogue parachute is cut away or otherwise detached from the main parachute at some point (e.g., after the main parachute inflates). As with the previous examples, in this example, the main parachute is a ballistic parachute where one or more rockets (222d) are used to extract and inflate the parachute.

In some embodiments, if both airspeed and tilt angle are available to a recovery system controller, the airspeed is used to select between single stage and multistage parachute deployment because the results are better and/or more accurate. Naturally, in some embodiments tilt angle may be used instead of airspeed (e.g., because the airspeed information is compromised and/or potentially bad but the tilt angle information is not).

The following figures describe more specific examples of vehicle state information which may be used to select between single stage parachute deployment versus multistage parachute deployment.

Figures 3, 4A, 4B, 4C:
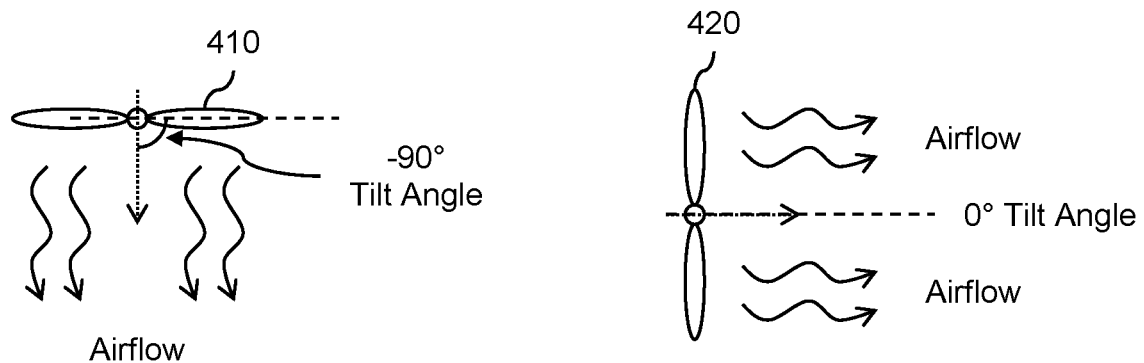
FIG. 3 is a table illustrating an embodiment where airspeed is used to select between single stage parachute deployment and multistage parachute deployment.
FIG. 4A is a table illustrating an embodiment where the tilt angle of the tiltrotors is used to select between single stage parachute deployment and multistage parachute deployment.
FIG. 4B is a diagram illustrating an example of a tiltrotor at a −90° tilt angle.
FIG. 4C is a diagram illustrating an example of a tiltrotor at a 0° tilt angle.

FIG. 3 is a table illustrating an embodiment where airspeed is used to select between single stage parachute deployment and multistage parachute deployment. In this example, the (measured) airspeed is compared against an airspeed threshold (airspeed_thresh) in order to select the parachute deployment mode or type. Column 300 shows two ranges of airspeeds and column 302 shows the corresponding type of parachute deployment that is selected. If the (measured) airspeed is between 0 and some airspeed threshold (e.g., inclusive), then single stage parachute deployment is selected per row 304. If the (measured) airspeed is (e.g., strictly) greater than the airspeed threshold and less than some maximum airspeed (airspeed_max), then multistage parachute deployment is selected (see row 306). As a practical matter, it may not be necessary to use or know the maximum airspeed In one example, an airspeed threshold of 30 meters per second is used for the exemplary aircraft described above which can fly at speeds between 0 knots and 150 knots (~87.45 meters per second).

FIG. 4A is a table illustrating an embodiment where the tilt angle of the tiltrotors is used to select between single stage parachute deployment and multistage parachute deployment. In this example, the (measured) tilt angle is compared against a tilt angle threshold (tilt_angle_thresh) in order to select the parachute deployment mode or type. For simplicity and ease of explanation, it is assumed that the tiltrotors have a 90° range of movement. Column 400 shows two ranges of tilt angles and column 402 shows the corresponding parachute deployment type or mode that is selected. In this example, if the tilt angle is between −90° and the tilt angle threshold (e.g., −60°), then single stage parachute deployment is selected (see row 404). If the tilt angle is between the tilt angle threshold and 0°, then multistage parachute deployment is selected (see row 406).

The following figures illustrate an example of the orientation of tiltrotors at −90° and 0° tilt angles, respectively.

FIG. 4B is a diagram illustrating an example of a tiltrotor at a −90° tilt angle. In this example, tiltrotor 410 is pointing downwards and has a tilt angle of −90°. See also tiltrotors 206b and 208b in FIG. 2B or 206c and 208c in FIG. 2C.

FIG. 4C is a diagram illustrating an example of a tiltrotor at a 0° tilt angle. In this example, tiltrotor 420 is pointing backwards and has a tilt angle of 0°. See also tiltrotors 206c and 208c in FIG. 2B or 206c and 208c in FIG. 2C.

In some embodiments, a flight controller maintains a state variable that it uses to keep track of a vehicle's mode of flight. For example, for the vehicle shown in FIGS. 2A-2D, the vehicle mode of flight (i.e., values of the state variable) can be: hover, forward flight, or transition(al) (e.g., the vehicle is transitioning from hover to forward flight or vice versa). In some embodiments, a vehicle's mode of flight (e.g., a state variable which is managed by the flight controller) is used to select between single stage parachute deployment and multistage. For example, if the mode is hover, then single stage deployment is selected. If the mode is forward flight, then multistage deployment is selected. If the mode is transition then single-stage deployment is selected if airspeed is less than the airspeed threshold, and multistage deployment is selected if airspeed is greater than the airspeed threshold. If vehicle operations guarantee that airspeed is always below or above the airspeed threshold in transition mode, then single-stage or multistage mode may be selected, respectively, without referencing airspeed.

Returning briefly to FIG. 1, in some embodiments, a fixed amount of time is used for the time between deployment of the drogue parachute at step 104 and deployment of the main parachute at step 106. For example, the worst case scenario (i.e., longest amount of time) could be calculated and that value could be used anytime (e.g., regardless of what the vehicle's sensors are reporting about the vehicle's state) a multistage parachute deployment is performed. Alternatively, a (real-time) determination or selection of the amount of time between the drogue parachute and main parachute is made in some embodiments. The following figures describe some examples of this.

Figure 5:
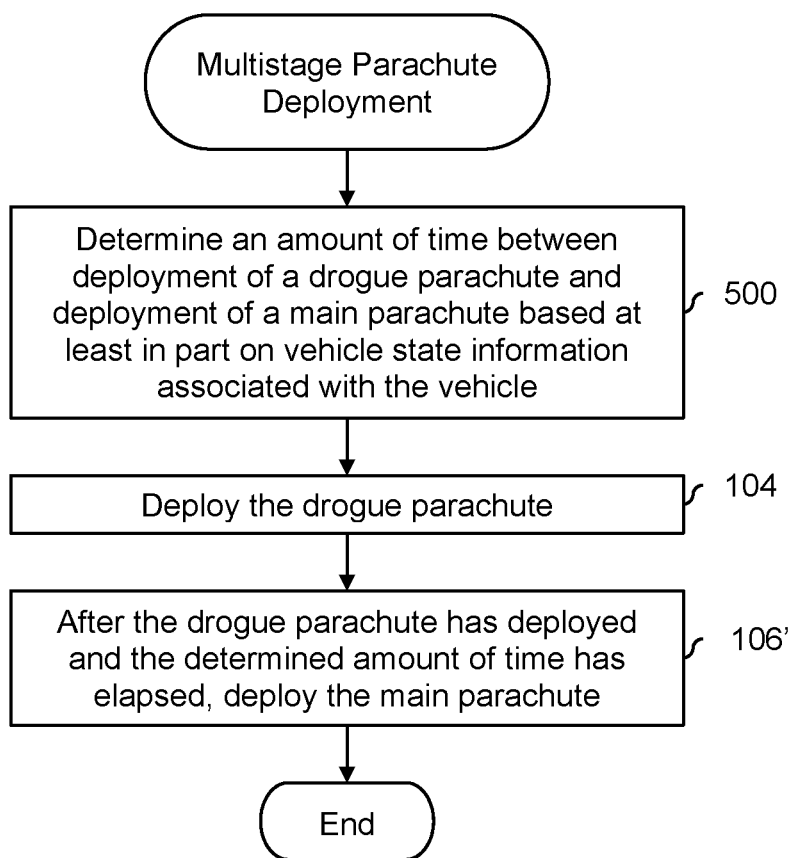
FIG. 5 is a flowchart illustrating an embodiment of a process to perform a multistage parachute deployment where an amount of time between the drogue parachute and the main parachute is determined based at least in part on vehicle state information.

FIG. 5 is a flowchart illustrating an embodiment of a process to perform a multistage parachute deployment where an amount of time between the drogue parachute and the main parachute is determined based at least in part on vehicle state information. Although not explicitly described in this example, in some embodiments the drogue parachute is jettisoned (e.g., cut or otherwise decoupled from the main parachute and/or the rest of the system) after the main parachute is deployed. For convenience and ease of explanation, the same or similar reference numbers are used to indicate related steps from FIG. 1.

At 500, an amount of time between deployment of a drogue parachute and deployment of a main parachute is determined based at least in part on vehicle state information associated with the vehicle. In some embodiments, the same vehicle state information that is used to select between single stage parachute deployment and multistage parachute deployment (e.g., at step 100 in FIG. 1) is used at step 500 to determine the amount of time. In one example, airspeed is used to select between single stage and multistage parachute deployment and (assuming multistage is selected) the airspeed is also used to determine the lag or delay between the drogue parachute and the main parachute. Some examples of this are described in more detail below.

Alternatively, in some embodiments, a second set of vehicle state information is used (e.g., at step 500) that is different from the vehicle state information that is used to select between single stage and multistage parachute deployment (e.g., at step 100 in FIG. 1). In one example, there is an additional piece of information used at step 500 that is not used at step 100 in FIG. 1. Some examples of this are described in more detail below.

At 104, the drogue parachute is deployed. At 106', after the drogue parachute has deployed and the determined amount of time has elapsed, the main parachute is deployed. For example, the drogue parachute (230d) in FIG. 2D is deployed first to slow down the aircraft before the main parachute (220d) is deployed. If the amount of time determined at step 500 is T_lag, then in FIG. 2D the main parachute (220d) would be deployed T_lag after deployment of the drogue parachute (230d).

The following figures describe more detailed examples of vehicle state information that may be used to calculate, select, or otherwise determine an amount of time between deployment of a drogue parachute and a main parachute.

Figure 6A:
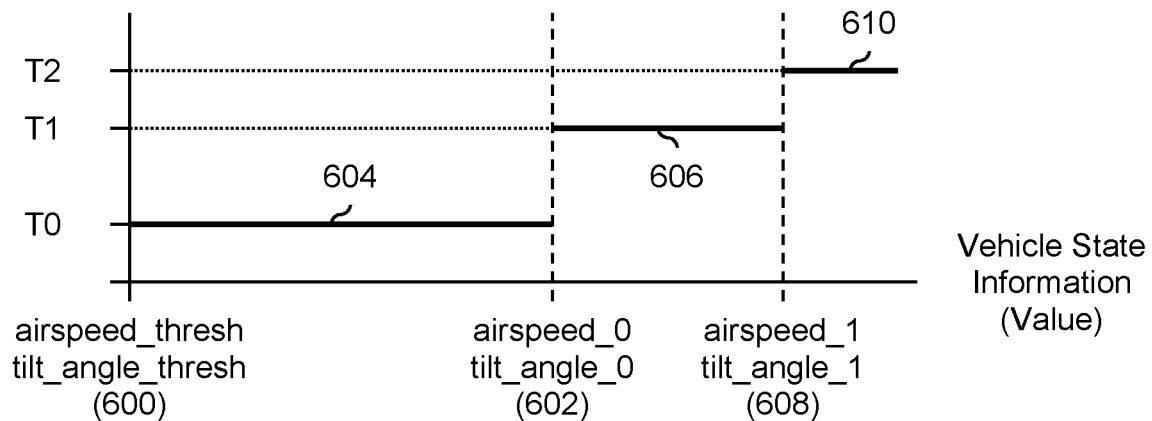
FIG. 6A is a graph illustrating an embodiment where ranges are used to determine an amount of time between deployment of a drogue parachute and deployment of a main parachute.

FIG. 6A is a graph illustrating an embodiment where ranges are used to determine an amount of time between deployment of a drogue parachute and deployment of a main parachute. In this example, a single piece or type of vehicle state information is used to determine an amount of time between deployment of a drogue parachute and deployment of a main parachute (T_lag) and that single piece or type of vehicle state information used to determine T_lag is the same one used to select between single stage and multistage parachute deployment. Although three bins or ranges are shown in this example, a different number of bins or ranges may be used if desired.

In this example, the x-axis of the graph shows the vehicle state information values and the y-axis shows the corresponding T_lag value (i.e., the amount of time between deployment of a drogue parachute and deployment of a main parachute). In some embodiments, the vehicle state information used to determine T_lag is airspeed (e.g., T_lag=f (AS)). In some embodiments, the vehicle state information used is the tilt angle of the tiltrotors (e.g., T_lag=f(TA)).

In this example, bins or ranges are defined where if the value of the vehicle state information falls into a particular bin, a corresponding T_lag value is selected. For example, if the value of the airspeed is between airspeed_thresh (600) and airspeed_0 (602), then a delay or lag of T0 (604) is selected for T_lag. In this example, it is assumed that airspeed_thresh, or alternatively tilt_angle_thresh, (600) is a cutoff above which multistage parachute deployment is performed and below which single stage parachute deployment is performed. Similarly, if the tilt angle is used then a T_lag value of T0 (604) is selected for tilt angles between tilt_angle_thresh (600) and tilt_angle_0 (602).

For the higher airspeeds or higher tilt angles (e.g., a more level or horizontal position) corresponding to the next bin, a larger T_lag value of T1 (606) is selected for values between airspeed_0/tilt_angle_0 (602) and airspeed_1/tilt_angle_1 (608). The largest T_lag value of T2 (610) is selected for values above airspeed_1/tilt_angle_1 (608). Conceptually, if the vehicle is flying faster (e.g., indicated by a higher airspeed or a tilt angle which is closer to 0°), then more time will be required for the drogue parachute to sufficiently slow down the vehicle before the main parachute can be safely deployed.

For completeness it is noted that the bin or range boundaries (e.g., airspeed_thresh/tilt_angle_thresh, airspeed_0/ tilt_angle_0, etc.) may be handled or mapped to a particular T_lag value in any appropriate and/or desired manner. For example, the values for which a T_lag of T0 is selected may be [airspeed_thresh, airspeed_0] or [tilt_angle_thresh, tilt_ angle_0]. This applies to other examples described herein.

Alternatively, in some embodiments a function used to determine T_lag is a continuously varying function. The following figure shows an example of this.

Figure 6B:
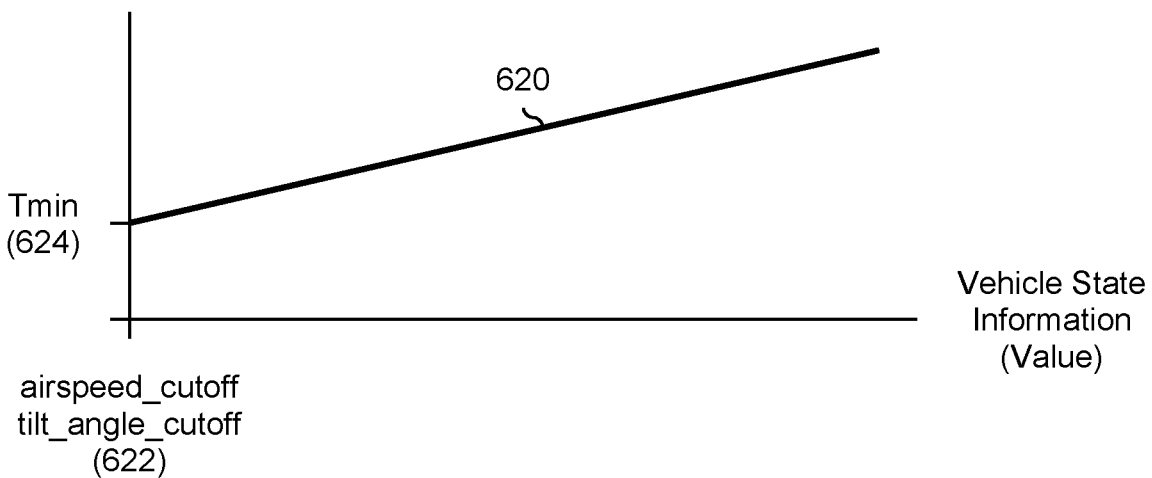
FIG. 6B is a graph illustrating an embodiment where a continuously varying function is used to determine an amount of time between deployment of a drogue parachute and deployment of a main parachute.

FIG. 6B is a graph illustrating an embodiment where a continuously varying function is used to determine an amount of time between deployment of a drogue parachute and deployment of a main parachute. As with the previous example, the vehicle state information used to select between single mode and multimode parachute deployment is the same as the vehicle state information that is used to determine T_lag. The x-axis of the graph shows the vehicle state information values (e.g., airspeed or tilt angle) and the y-axis shows the corresponding T_lag value.

In this example, a linear function (620) is used to determine or otherwise calculate T_lag based on the value of the vehicle state information (e.g., airspeed or tilt angle). At a cutoff value (622), such as airspeed_cutoff or tilt_angle_cutoff, the T_lag value is Tmin (624) T_lag increases linearly from there. In some embodiments, the range of T_lag values includes zero, which corresponds to a single-stage simultaneous deployment as described above (see, e.g., drogue parachute 230c and main parachute 220c in FIG. 2C). For example, the T_lag function may be a sliding scale ranging from simultaneous deploy (i.e., Tmin=0) up to some maximum lag between the two deployments as airspeed increases. The linear function (620) shown here is merely exemplary and any appropriate function may be used. In some embodiments, the function is implemented as a lookup table for ease of implementation and/or access speed.

In the examples described above, a single-input function is used to calculate or otherwise determine T_lag. In some embodiments, two or more inputs (e.g., two different types of vehicle state information) are used to determine T_lag. The following figures describe an example of this.

Figure 7A:
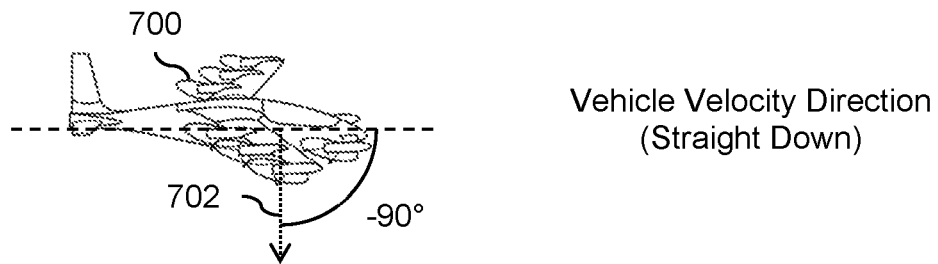
FIG. 7A is a diagram illustrating an embodiment of a vehicle with a vehicle velocity direction that is (substantially) straight down.

FIG. 7A is a diagram illustrating an embodiment of a vehicle with a vehicle velocity direction that is (substantially) straight down. In this example, the tiltrotors (700) of the vehicle are pointing straight down and the vehicle is hovering at or near an airspeed of 0 before some catastrophic failure occurred which caused the recovery system to be deployed (e.g., either manually by the pilot or automatically by the recovery system controller). As a result of the vehicle's low airspeed at the time of the catastrophic failure, the direction of the vehicle's velocity (702), sometimes referred to herein as the vehicle velocity direction, is pointing straight down (e.g., at an angle of −90° relative to a horizontal axis). When a vehicle is falling or otherwise moving straight down with some starting velocity (as shown here), the peak net airspeed during the opening sequence will be greater than the case in which the vehicle is moving forward with the same starting velocity. As a result, knowing initial direction of vehicle velocity relative to gravity can help determine peak airspeed during the opening sequence and assist generally in mode selection and optimization of time delays. In general, the drogue parachute (should) stay open longer the more the vehicle velocity direction points straight down, or aligns with gravity, to facilitate vehicle recovery.

Figure 7B:
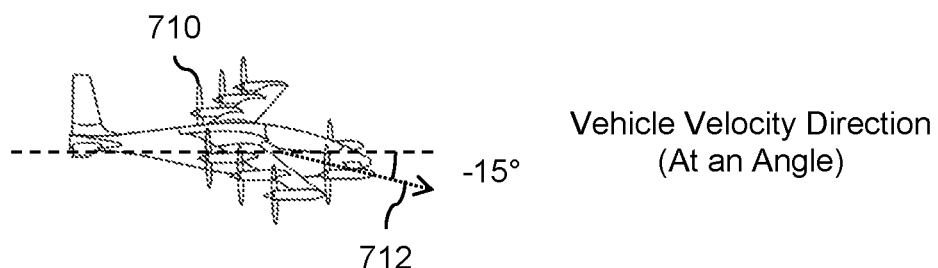
FIG. 7B is a diagram illustrating an embodiment of a vehicle with a vehicle velocity direction that is at an angle.

FIG. 7B is a diagram illustrating an embodiment of a vehicle with a vehicle velocity direction that is at an angle. In this example, the tiltrotors (710) of the vehicle are pointing straight back and the vehicle was flying forwards at (generally speaking) a moderate to high rate of speed. As such, if a (catastrophic) failure were to occur in this state, the vehicle velocity direction (712) will be at an angle (e.g., −15° relative to a horizontal axis). With the drogue parachute deployed in this state (i.e., with this vehicle velocity direction), the vehicle peak airspeed will be lower (e.g., for a same or given starting airspeed) compared to the vehicle shown in FIG. 7A. In other words, in general, the closer the vehicle velocity direction is to a horizontal axis, the lower the vehicle peak net airspeed during the deployment sequence. This allows higher starting airspeeds for single-stage mode or shorter delays at angles approaching horizontal, assuming a fixed peak total airspeed that is allowed before occupant, vehicle, or parachute load limits are reached.

In some embodiments, vehicle velocity direction is used in addition to some other vehicle state information (e.g., airspeed) to determine an amount of time between deployment of a drogue parachute and a main parachute (T_lag). The following figure shows an example of this.

Figure 7C:
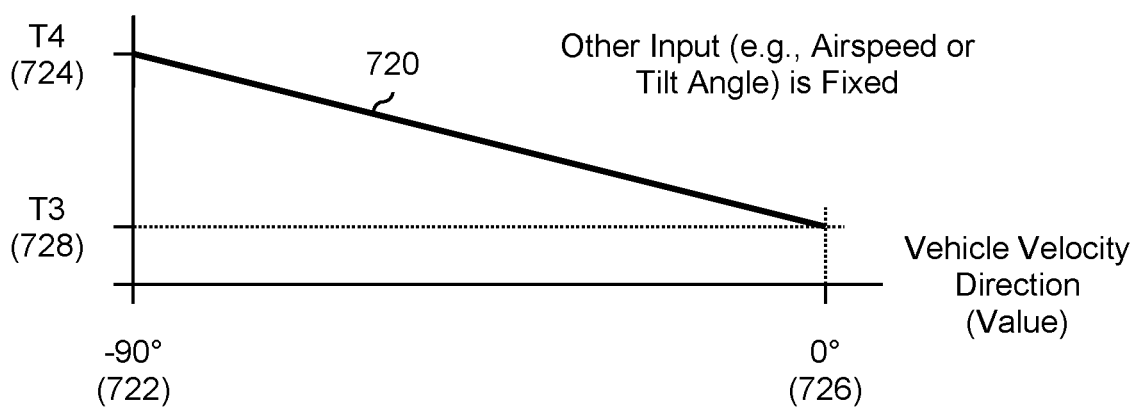
FIG. 7C is a graph illustrating an embodiment of using vehicle velocity direction to determine an amount of time between deployment of a drogue parachute and deployment of a main parachute.

FIG. 7C is a graph illustrating an embodiment of using vehicle velocity direction to determine an amount of time between deployment of a drogue parachute and deployment of a main parachute. In this example, two inputs or pieces of vehicle state information are used to determine T_lag, one of which is vehicle velocity direction (i.e., T_lag=f(·, VVD)). For simplicity and ease of explanation, the other pieces of vehicle state information (e.g., airspeed or tilt angle) are fixed in this graph (i.e., a 2D graph is shown here to illustrate characteristics of the more complete 3D graph). In the graph shown here, the x-axis shows vehicle velocity direction (e.g., ranging from −90° to 0°) and the y-axis shows the corresponding T_lag value.

In this example, T_lag is a linear function (720) of the vehicle velocity direction where the other input (e.g., airspeed or tilt angle) is fixed. When the vehicle velocity direction is −90° (722), T_lag value of T4 (724) is generated or otherwise output. For a vehicle velocity direction of 0° (726), the T_lag value is T3 (728) where T3<T4. Although the example function shown here is linear, any type of function may be used.

As an example of what a corresponding 3D graph would look like (e.g., if the other piece of vehicle state information, such as airspeed or tilt angle, were permitted to vary), it is noted that T_lag generally increases as the airspeed or tilt angle increases, as shown in FIG. 6A and FIG. 6B. Therefore, the largest T_lag value will (generally speaking) be generated when the vehicle velocity direction is at or near −90° (i.e., the vehicle velocity direction is straight down or close to it) and the airspeed or tilt angle is at or near its maximum value. Conversely, the smallest T_lag value will (generally speaking) be generated when the vehicle velocity direction is at or near 0° (i.e., the vehicle velocity direction is horizontal or close to it) and the airspeed or tilt angle is at or near 0. In some embodiments, modeling and/or testing may be used to interpolate and/or otherwise determine some or all of the T_lag values generated by f(·, VVD) or whatever function is being used.

In the example of FIG. 7A-FIG. 7C, the vehicle state information used to generate the amount of time between the drogue parachute and the main parachute (i.e., T_lag) is different from the vehicle state information that is used to select between single stage and multistage parachute deployment. For example, just the airspeed or just the tilt angle may be used to select between the types of parachute deployment, while the airspeed and the vehicle velocity direction (or alternatively the tilt angle and the vehicle velocity direction) may be used to generate the value of T_lag. The following figure describes another example where the two sets of vehicle state information are different from each other (but as described herein in some embodiments the same metrics or vehicle state information are used for mode selection and delay determination).

Figure 8:
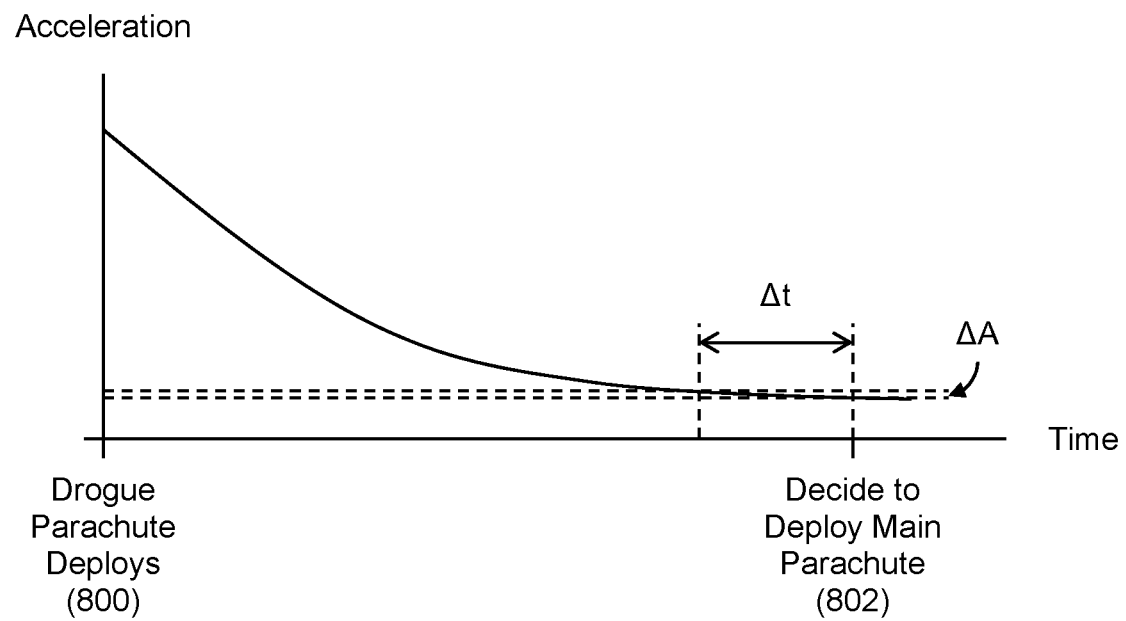
FIG. 8 is a graph illustrating an embodiment of using acceleration to determine an amount of time between deployment of a drogue parachute and deployment of a main parachute.

FIG. 8 is a graph illustrating an embodiment of using acceleration to determine an amount of time between deployment of a drogue parachute and deployment of a main parachute. In this example, the acceleration of the vehicle is analyzed over time after the drogue parachute deploys (800). Conceptually, the acceleration is examined to identify when it has leveled out. This is an indication that the drogue parachute has slowed the vehicle down to the extent possible and that it is time to deploy the main parachute. In this example, when ΔA/Δt (alternatively, the derivative of the acceleration function, dA/dt) drops below some threshold (e.g., close to 0), a decision is made to deploy the main parachute (802).

As described above, this is one example where the vehicle state information used to determine T_lag is different from the vehicle state information that is used to select between single stage and multistage parachute deployment. For example, the vehicle's acceleration may be used for the former and the vehicle's airspeed (or, alternatively, tilt angle) may be used for the latter.

In some embodiments, a given type of vehicle state information (used for whatever purpose) is reported from multiple sensors. The following figures describe some examples where the sensors report different and/or conflicting vehicle state information and steps that may be taken in response.

Figure 9A:
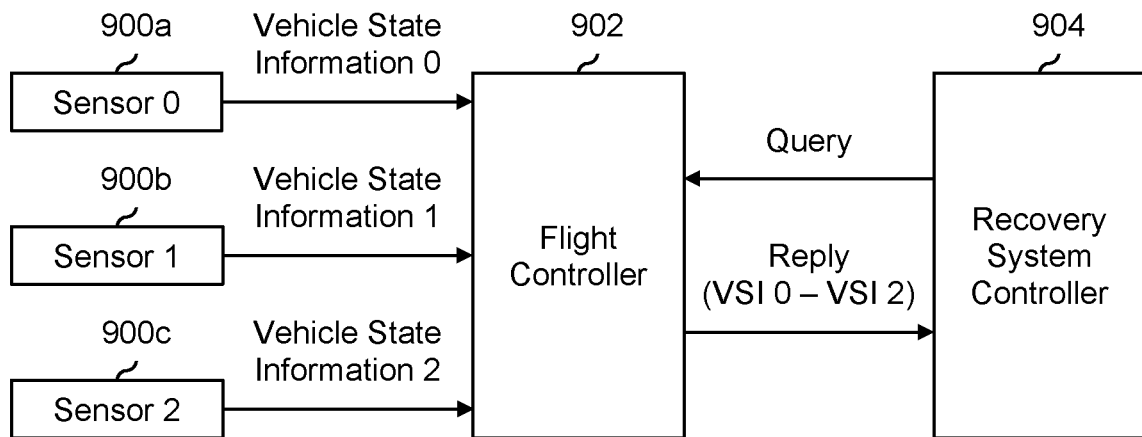
FIG. 9A is a diagram illustrating an embodiment of a system diagram which includes redundant sensors, a flight controller, and a recovery system controller.

FIG. 9A is a diagram illustrating an embodiment of a system diagram which includes redundant sensors, a flight controller, and a recovery system controller. In the example shown, three independent and redundant sensors (900a-900c) are used to report a given type of vehicle state information. For example, if airspeed is being reported, all of the sensors might be pitot tubes which report independent airspeed values. The sensors pass on their measured values (i.e., vehicle state information) to the flight controller (902). It is noted that the number of sensors shown herein is merely exemplary and any number of sensors may be used.

In this example, the recovery system controller (904) periodically sends a status query to the flight controller (902). The flight controller responds with a reply. In some embodiments, the reply includes the status of the flight controller and/or the status of the sensors. For example, if the flight controller becomes aware it is compromised but is still able to communicate with the recovery system controller, the reply may include "flight_computer_health=BAD" (as an example). In some embodiments, vehicle state information from the sensors is included in the reply (e.g., on a regular basis, even if the flight controller detects no failures in the sensors or the vehicle overall).

As will be described in more detail below, including vehicle state information (which is agreed upon by at least 2 out of 3 sensors) may enable the recovery system controller to have a copy of vehicle state information that is known to be good and recent (fresh) in case the flight controller and/or sensors fail and the recovery system controller needs good and recent vehicle state information to (as an example) select between single stage and multistage parachute deployment and/or determine an amount of time between a drogue and main parachute.

Figure 9B:
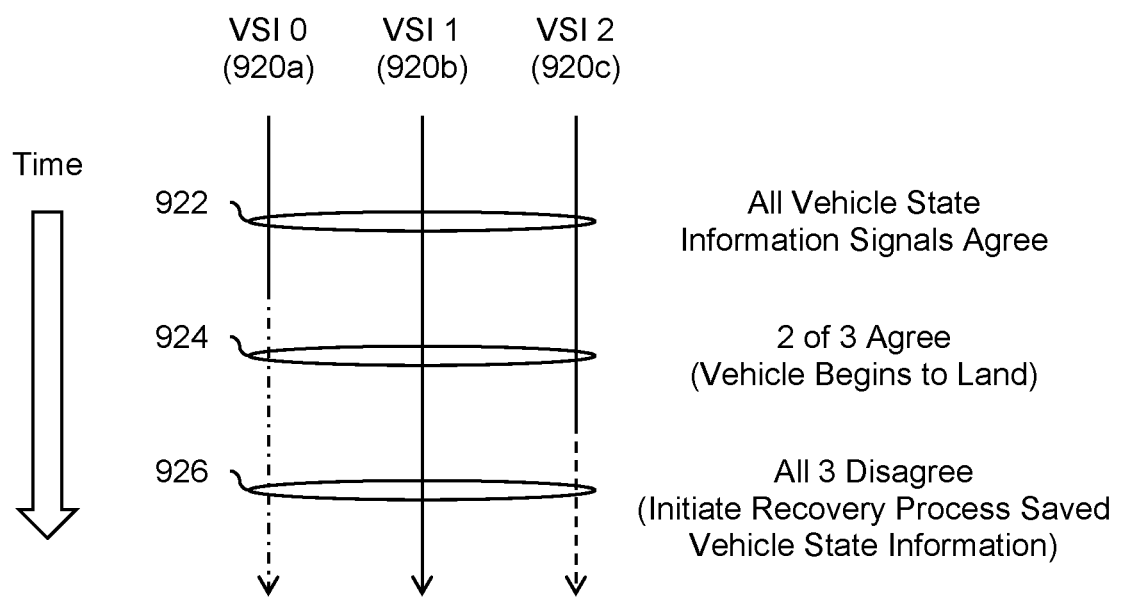
FIG. 9B is a diagram illustrating an embodiment of vehicle state information signals that diverge over time.

FIG. 9B is a diagram illustrating an embodiment of vehicle state information signals that diverge over time. In this example, the three vehicle state information signals (920a-920c) are respectively output by sensors 900a-900c from FIG. 9A. Initially, all vehicle state information signals (920a-920c) agree at time 922.

In this state, flight controller 902 in FIG. 9A (assuming it is functional) might (as an example) send to recovery system controller 904 a reply of "flight_computer_health=GOOD; VSI_0=COMMON_VALUE0; VSI_1=COMMON_VALUE0; VSI_2=COMMON_VALUE0". In this example, all three vehicle state information signals are included in the reply which permits the recovery system controller (904 in FIG. 9A) to know that all three are in agreement with each other. Naturally, this information may be conveyed between the flight controller and recovery system in a variety of ways and these message fields and/or format is merely exemplary and is not intended to be limiting.

Later, at time 924, VSI 0 (920a) diverges from the other vehicle state information signals (920b and 920c). In other words, 2 out of 3 vehicle state information signals agree with each, down from 3 out of 3.

In this state, flight controller 902 in FIG. 9A might send a reply to recovery system controller 904 with "flight_computer_health=GOOD; VSI_0=VALUE A; VSI_1=COMMON_VALUE1; VSI_2=COMMON_VALUE1". In this example, the flight controller (e.g., 902 in FIG. 9A) will force the vehicle to land as soon as possible when one of the sensors reports divergent vehicle state information from the other sensors.

While the vehicle is descending but before the vehicle has landed, all three vehicle state information signals (920a-920c) disagree with each other at time 926. For example, flight controller 902 in FIG. 9A would send to recovery system controller 904 a reply of "flight_computer_health=GOOD; VSI_0=VALUE_B; VSI_1=VALUE_C; VSI_2=VALUE_D". In response, the recovery system controller 904 may (automatically) decide to deploy the recovery system.

Before any of the parachutes are actually launched, the recovery system controller selects between single stage and multistage parachute deployment (e.g., per FIG. 1). To make that decision, the recovery system controller will use the most recent vehicle state information where at least 2 of the 3 signals agreed with each other. In this example, the values reported by VSI 1 (920b) and VSI 2 (920c) at time 924 are used to make any decisions and/or calculations since those signals are the last time that at least two of the signals are in agreement with each other and they are therefore known to be recent and good. This information is deemed to be both good (e.g., because it is unlikely that this information is inaccurate) and recent (e.g., because at most this information is from the second-most-recent reply). It would be bad, for example, to make decisions about the parachute using bad and/or old vehicle state information. Similarly, if the recovery system controller is configured to determine T_lag (i.e., this is not an embodiment where a fixed T_lag value is used), the most recent vehicle state information when at least 2 of the 3 signals agreed with each other would be used.

The following figures describe this more formally and/or generally in flowcharts.

Figure 10:
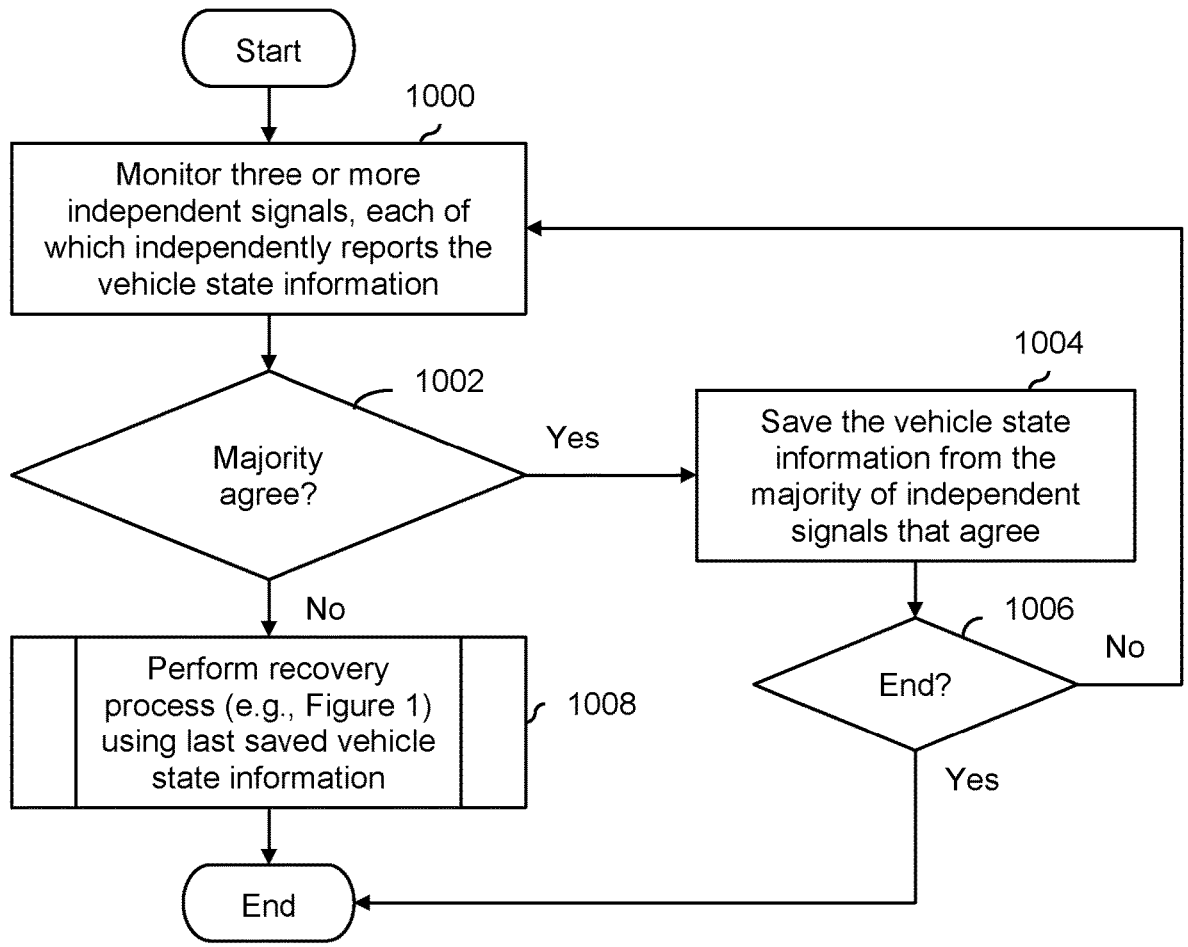
FIG. 10 is a flowchart illustrating an embodiment of a process to perform a recovery process using saved vehicle state information that is known to be good and recent.

FIG. 10 is a flowchart illustrating an embodiment of a process to perform a recovery process using saved vehicle state information that is known to be good and recent. In this example, there are assumed to be three independent signals or sensors but naturally any number may be used. In some embodiments, this process is used in combination with FIG. 1.

At 1000, three or more independent signals are monitored, each of which independently reports the vehicle state information. For example, in FIG. 9A, the recovery system controller (904) gets the three independent signals from the reply message from the flight controller (902). Alternatively, the recovery system controller (904) may have a direct path to the sensors (900a-900c) that bypasses the flight controller (902).

At 1002, it is determined if a majority of the three independent signals agree. For example, in FIG. 9B, the decisions would be Yes at time 922 (because all three signals 920a-920c agree at that time), Yes at time 924 (because signals 920b and 920c agree at that time), and No at time 926 (because all three signals disagree at that time).

If it is determined at 1002 that a majority agree, then the vehicle state information from the majority of the independent signals that agree is saved at 1004. For example, even if three out of three signals are reporting the same information and the flight controller is detecting no issues, it would be better to save the information since a failure may occur suddenly and unexpectedly.

After saving the vehicle state information at step 1004, it is determined at 1006 whether to end the process. For example, this process may run continuously until the vehicle lands. If it is decided not to end the process at 1006 then the independent signals continue to be monitored at step 1000.

Returning to step 1002, if it is determined that a majority of the independent signals do not agree, then at 1008 a recovery process is performed using the most recently saved vehicle state information. For example, a recovery system controller may perform the process of FIG. 1 using the most recently saved information (e.g., saved during the last iteration through step 1004) which is known to be good and recent. Or, in FIG. 5, the most recently saved vehicle state information may be used to determine an amount of time between deployment of a drogue parachute and a main parachute.

The technique described above (where vehicle state information is saved for use if needed) may be attractive in applications where there is a very strict vehicle weight limit and/or the vehicle is relatively cost constrained because new and/or additional sensors are not required. An alternative solution, for example, would be to have the recovery system controller have its own sensor(s) that is/are independent from the sensors (e.g., 900a-900c) that report to the flight controller. For vehicles with more lenient weight and cost restrictions, this may be an attractive solution.

Returning briefly to FIG. 9A, in some cases, the flight controller (902) may not respond at all to the query from the recovery system controller (904), or the flight controller may indicate that it has detected some error or failure in itself and/or other components or devices in the vehicle. The following figure describes an example where a recovery process is automatically initiated by a recovery system controller (e.g., in response to a lack of response from the flight controller and/or an error or failure reported by the flight controller).

Figure 11:
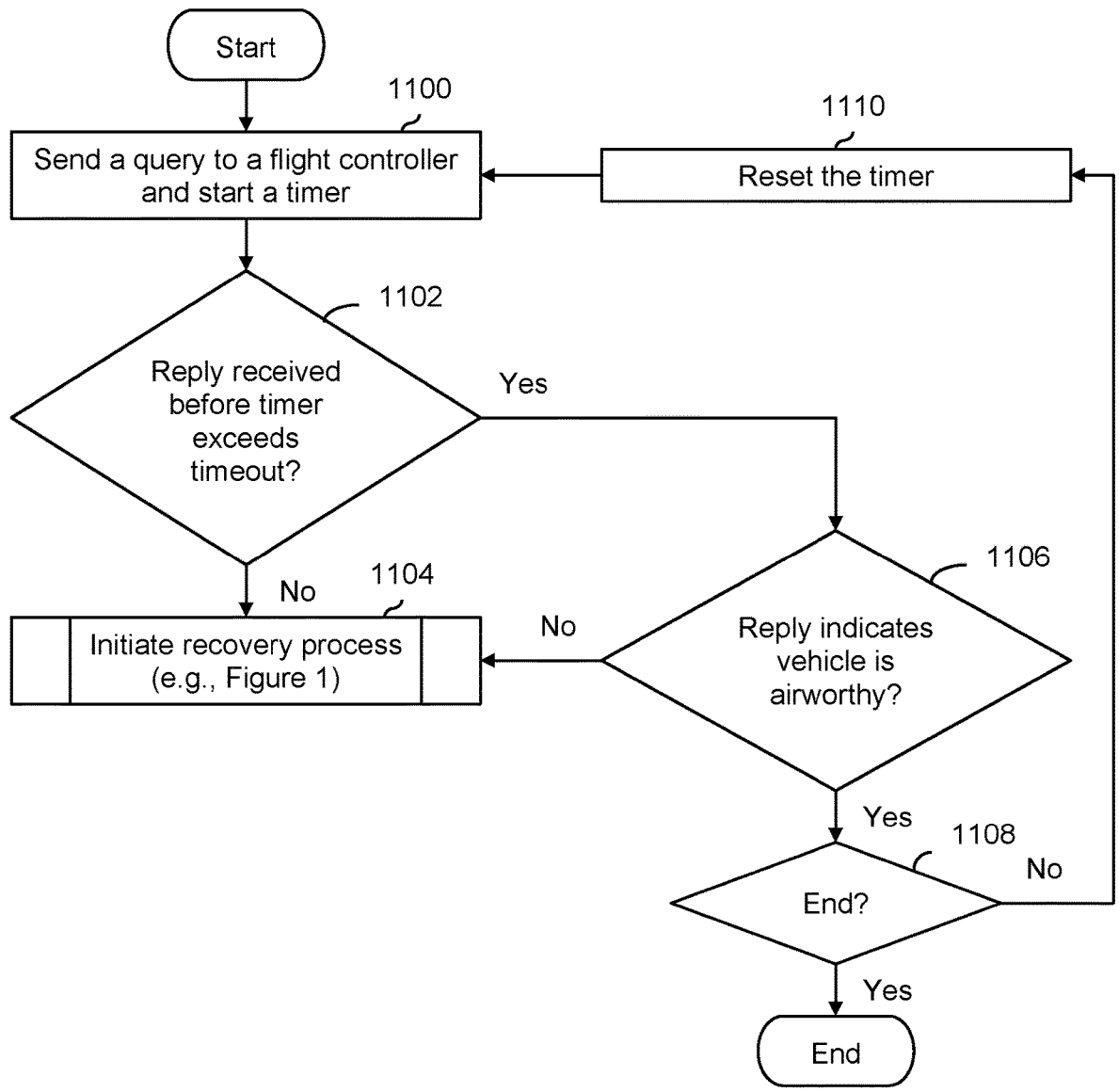
FIG. 11 is a flowchart illustrating an embodiment of a process to perform a recovery process using saved vehicle state information that is known to be good and recent.

FIG. 11 is a flowchart illustrating an embodiment of a process to perform a recovery process using saved vehicle state information that is known to be good and recent. In one example, the process is performed by recovery system controller 904 in FIG. 9A.

At 1100, a query is sent to a flight controller and a timer is started. For example, recovery system controller 904 in FIG. 9A periodically sends a query to flight controller 902. A timer in the flight controller (e.g., initially at 0) starts to count (e.g., upwards).

At 1102, it is determined whether a reply is received before the timer exceeds a timeout. For example, the timeout may be set to a relatively high value that the flight computer, when operating normally, is expected to easily and/or definitely respond by. If the timer exceeds the timeout value without a reply being received, then that is an indication that the flight computer has failed (and therefore the recovery system controller should perform a recovery process). As such, if the timer exceeds the timeout without a reply being received at step 1102, then a recovery process (e.g., FIG. 1) is initiated or otherwise performed at 1104.

Alternatively, if a reply is received before the timeout is exceeded at step 1102, then at 1106 it is determined if the reply indicates that the vehicle is airworthy. For example, the flight computer may be responsive and operational but may also have detected a failure in one of the vehicle's components (e.g., a motor controller is unresponsive, a control surface is stuck in a particular position, etc.). That detected failure and/or other indication that the vehicle is not airworthy may be communicated in the reply.

If the reply indicates that the vehicle is not airworthy at step 1106, then a recovery process (e.g., FIG. 1) is initiated or otherwise performed at 1104. Otherwise, if the reply indicates that the vehicle is airworthy, it is decided whether to end the process at 1108. For example, the process may end when the vehicle lands or the vehicle is powered down. If it is decided not to end the process at step 1108 then at step 1110 the timer is reset (e.g., back to 0). The process repeats at step 1100 when a next query is sent.

For brevity, this example shows the recovery system controller initiating a recovery process if either a timeout is exceeded or if there is an indication (e.g., from a flight controller) that the vehicle is not airworthy. Naturally, in some embodiments, a recovery system controller may only check for one of these things. For example, if there were no timeout check, then step 1100 would not necessarily start a timer and step 1100 would go directly to step 1106 (i.e., skipping step 1102).

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
a recovery system controller which is configured to:
select between single stage parachute deployment and multistage parachute deployment for a vehicle based at least in part on vehicle state information;
in the event multistage parachute deployment is selected:
deploy a drogue parachute during a first deployment stage;
determine an amount of time to wait before deploying a main parachute in a second deployment stage based at least in part on vehicle state information; and
deploy the main parachute during a second deployment stage after the determined amount of time has elapsed; and
in the event single stage parachute deployment is selected, deploy at least the main parachute in a single stage.

2. The system recited in claim 1, wherein at least one of the main parachute or the drogue parachute is deployed using one or more rockets.

3. The system recited in claim 1, wherein selecting between single stage parachute deployment and multistage parachute deployment is based at least in part on airspeed.

4. The system recited in claim 1, wherein selecting between single stage parachute deployment and multistage parachute deployment is based at least in part on a tilt angle associated with a tiltrotor included in the vehicle.

5. The system recited in claim 1, wherein selecting between single stage parachute deployment and multistage parachute deployment includes comparing the vehicle state information against a threshold.

6. The system recited in claim 1, wherein selecting between single stage parachute deployment and multistage parachute deployment is based at least in part on a state variable associated with the vehicle's mode of flight.

7. The system recited in claim 1, wherein:
in the event multistage parachute deployment is selected, the recovery system controller is further configured to determine an amount of time between deployment of the drogue parachute and deployment of the main parachute based at least in part on the same vehicle state information that is used to select between single stage parachute deployment and multistage parachute deployment; and
the main parachute is deployed after the drogue parachute has deployed and the determined amount of time has elapsed.

8. The system recited in claim 1, wherein:
in the event multistage parachute deployment is selected, the recovery system controller is further configured to determine an amount of time between deployment of the drogue parachute and deployment of the main parachute based at least in part on a second set of vehicle state information that is different from the vehicle state information that is used to select between single stage parachute deployment and multistage parachute deployment; and
the main parachute is deployed after the drogue parachute has deployed and the determined amount of time has elapsed.

9. The system recited in claim 1, wherein:
in the event multistage parachute deployment is selected, the recovery system controller is further configured to determine an amount of time between deployment of the drogue parachute and deployment of the main parachute based at least in part on a second set of vehicle state information that is different from the vehicle state information that is used to select between single stage parachute deployment and multistage parachute deployment;
the main parachute is deployed after the drogue parachute has deployed and the determined amount of time has elapsed;
the vehicle state information that is used to select between single stage parachute deployment and multistage parachute deployment includes airspeed and excludes vehicle velocity direction; and
the second set of vehicle state information includes airspeed and vehicle velocity direction.

10. The system recited in claim 1, wherein the recovery system controller is further configured to:
monitor three or more independent signals, each of which independently reports the vehicle state information; and
in the event a majority of the independent signals agree, save the vehicle state information from the majority of the independent signals that agree, wherein selecting between single stage parachute deployment and multistage parachute deployment includes using a most recently saved vehicle state information.

11. The system recited in claim 1, wherein the recovery system controller is further configured to:
send a query to a flight controller and start a timer; and
in the event a reply is not received before the timer exceeds a timeout:
select between single stage parachute deployment and multistage parachute deployment;
in the event multistage parachute deployment is selected:
deploy the drogue parachute; and
after the drogue parachute has deployed, deploy the main parachute; and
in the event single stage parachute deployment is selected, deploy the main parachute without prior deployment of the drogue parachute.

12. The system recited in claim 1, wherein the recovery system controller is further configured to:
send a query to a flight controller; and
in the event a reply indicates that the vehicle is not airworthy:
select between single stage parachute deployment and multistage parachute deployment;
in the event multistage parachute deployment is selected:
deploy the drogue parachute; and
after the drogue parachute has deployed, deploy the main parachute; and
in the event single stage parachute deployment is selected, deploy the main parachute without prior deployment of the drogue parachute.

13. A method, comprising:
selecting between single stage parachute deployment and multistage parachute deployment for a vehicle based at least in part on vehicle state information;
in the event multistage parachute deployment is selected:
deploying a drogue parachute during a first deployment stage;
determining an amount of time to wait before deploying a main parachute in a second deployment stage based at least in part on vehicle state information;
deploying the main parachute during a second deployment stage after the determined amount of time has elapsed; and
in the event single stage parachute deployment is selected, deploying at least the main parachute in a single stage.

14. The method recited in claim 13, wherein at least one of the main parachute or the drogue parachute is deployed using one or more rockets.

15. The method recited in claim 13, wherein selecting between single stage parachute deployment and multistage parachute deployment is based at least in part on airspeed.

16. The method recited in claim 13, wherein selecting between single stage parachute deployment and multistage parachute deployment is based at least in part on a tilt angle associated with a tiltrotor included in the vehicle.

17. The method recited in claim 13, wherein selecting between single stage parachute deployment and multistage parachute deployment includes comparing the vehicle state information against a threshold.

18. The method recited in claim 13, wherein selecting between single stage parachute deployment and multistage parachute deployment is based at least in part on a state variable associated with the vehicle's mode of flight.

19. The method recited in claim 13, wherein:
in the event multistage parachute deployment is selected, determining an amount of time between deployment of the drogue parachute and deployment of the main parachute based at least in part on the same vehicle state information that is used to select between single stage parachute deployment and multistage parachute deployment; and
the main parachute is deployed after the drogue parachute has deployed and the determined amount of time has elapsed.

20. A computer program product, the computer program product being embodied in a non-transitory computer readable storage medium and comprising computer instructions for:
selecting between single stage parachute deployment and multistage parachute deployment for a vehicle based at least in part on vehicle state information;
in the event multistage parachute deployment is selected:
deploying a drogue parachute during a first deployment stage;
determining an amount of time to wait before deploying a main parachute in a second deployment stage based at least in part on vehicle state information;
deploying the main parachute during a second deployment stage after the determined amount of time has elapsed; and
in the event single stage parachute deployment is selected, deploying at least the main parachute in a single stage.

* * * * *

UNITED STATES PATENT AND TRADEMARK OFFICE
CERTIFICATE OF CORRECTION

PATENT NO. : 11,208,214 B2
APPLICATION NO. : 16/744620
DATED : December 28, 2021
INVENTOR(S) : Craig Western et al.

It is certified that error appears in the above-identified patent and that said Letters Patent is hereby corrected as shown below:

In the Specification

In Column 8, Line(s) 20, after "maximum airspeed", insert --.--.
In Column 13, Line(s) 62, delete "VSI_0 = VALUE A" and insert --VSI_0 = VALUE_A--, therefor.

Signed and Sealed this
Eighteenth Day of October, 2022

Katherine Kelly Vidal
*Director of the United States Patent and Trademark Office*